| United States Patent [19] | [11] 3,841,227 |
|---|---|
| Fink | [45] Oct. 15, 1974 |

[54] SUSPENSION SYSTEM FOR A MAGNETIC SUSPENSION RAILROAD

[75] Inventor: Hermann Fink, Davis, Calif.

[73] Assignee: Siemens Aktiengesellschaft, Munchen, Germany

[22] Filed: Sept. 24, 1973

[21] Appl. No.: 399,949

[30] Foreign Application Priority Data
Oct. 13, 1972 Germany............................ 2250372

[52] U.S. Cl. ............................ 104/148 SS, 104/130
[51] Int. Cl. ............................................. B61b 13/08
[58] Field of Search ................. 104/148 MS, 148 SS

[56] References Cited
UNITED STATES PATENTS
3,589,300   6/1971   Wipf............................. 104/148 SS
3,780,667   12/1973   Miericke et al............. 104/148 MS OTHER PUBLICATIONS
Richards et al., Magnetic Suspension and Propulsion Systems for High Speed Transportation, J. Appl. Phys., Vol. 43, No. 6, June 1972, p. 2,680.

Primary Examiner—M. Henson Wood, Jr.
Assistant Examiner—George H. Libman
Attorney, Agent, or Firm—Kenyon & Kenyon Reilly Carr & Chapin

[57] ABSTRACT

An improved suspension arrangement for a magnetic suspension railroad in which secondary reaction members are provided on each side of the roadbed which members comprise U shaped guidance channels having upper and lower horizontal members with a lateral member approximately perpendicular to the roadbed, which guidance channels coact with pairs of superconducting magnet coils in the vehicle disposed horizontally with respect to the roadbed one of which is arranged between the upper and lower parts of the guidance channels and the other of which is arranged above the upper guidance channel.

15 Claims, 6 Drawing Figures

PATENTED OCT 15 1974 3,841,227

SUSPENSION SYSTEM FOR A MAGNETIC SUSPENSION RAILROAD

BACKGROUND OF THE INVENTION

This invention relates to magnetic suspension railroads in general and more particularly to an improved suspension arrangement for use in such railroads.

Various systems have previously been developed for use in electrodynamically guiding a suspended vehicle. Such suspension systems are operable with vehicle velocities of approximately 300 km/hour and more. Generally in all of these systems, as the vehicle moves along the track, currents are induced by superconducting magnetic coils attached to the vehicles in electrically conducting support and/or guidance elements arranged along the roadbed. These elements on the roadbed will comprise for example, electrically conducting plates or conductor loops extending in the direction of travel of the roadbed. The currents induced therein exert repelling forces on the magnetic coils which are utilitized for supporting and/or guiding the vehicle along the track.

The simplest system of this nature is called a normal flux system and comprises a horizontally disposed conducting plate running along the roadbed over which the magnet coil moves with the magnet coil also disposed in a horizontal plane. As the magnet coil approaches the plate, the repulsion forces become larger causing the separation between the plate and magnet coil to increase and thus hold the magnet coil suspended. In addition to the lifting forces, which oppose the force of gravity of the vehicle, braking forces are also induced due to the ohmic resistance of the conducting plate, which forces have a direction which is opposite to the travel direction of the vehicle. Systems of this nature however, do not provide sufficient vehicle stabilization against laterally acting forces or against forces which try to lift the vehicle off the track. In other words, the system does not insure sufficient guidance of the suspended vehicle both horizontally and vertically.

A system which does provide sufficient guidance is described in a paper by Guderjahn et al published in the Journal of Applied Physics vol. 40, pp 2,133–2,140, [1969]. In the system disclosed therein, a U shaped guidance channel opens toward the center of the roadbed from each side and is made of aluminum. Superconducting magnet coils are mounted in the vehicle and disposed in a horizontal plane between the upper and lower surfaces of the guidance channel. The lifting forces and vertical guidance forces result from the eddy currents which are generated in the upper and lower parts of the guidance channels disposed approximately horizontally. Horizontal guidance is effected essentially by the currents induced in the lateral parts of the guidance channels which are disposed approximately perpendicular to the roadbed. As compared to the normal flux system described above relatively large braking forces are developed because of the additional losses generated in the upper and lateral parts of the guidance channels. In addition, a larger current is required for suspending a vehicle of the same weight due to the repulsion forces acting on the magnet coils from the upper parts of the channel, which forces act in the same direction as the gravity force. This in return requires a larger and more expensive superconducting magnet coil arrangement.

In another article by Guderjahn et al published in the Journal "Cyrogenics" vol. 11, pp 171–178, [1971], a system was proposed in which increased lifting forces could be generated by arranging on the under side of the upper part of each channel a ferromagnetic material, for example steel, which extended along the channel. Thereby the electromagnetic attraction between the superconducting magnet coils and ferromagnetic plate would be added to the electrodynamically generated lifting forces. However, magnetic losses in the ferromagnetic material will result in this system. Once the ferromagnetic material is saturated, the occurrence of which is often difficult to control, and to some extent even before saturation, eddy current losses in the nonmagnetic, electrically conducting upper part of the channel also occur.

In a paper published in the Journal of Applied Physics, vol. 43, [1972], pp. 2,680–2,691 by Richards et al., a system in which braking forces and losses are relatively small has been described. This system is called a zero flux system and includes superconducting magnet coils mounted on the vehicle and arranged in pairs one above the other vertically. The two coils are excited in mutually opposite directions and are guided above and below an electrically conducting plate which is coupled to the roadbed and disposed generally horizontally. With such an arrangement, particularly if the plate is thin relative to the depth of penetration of the magnetic field into the plate material, low losses result. With the exception of small losses produced in the center portion which causes braking forces, only if the plate is not situated in the center between the coils of the respective coil pairs are any significant losses produced. The braking force produced is in the first approximation proportional to the square of the excursion of the center position while the lifting force produced is in the first approximation directly proportional to the excursion. As compared to other systems in order to obtain lifting forces for a vehicle of the same weight, two two magnet coils are required as compared to one magnet coil in the normal flux system mentioned above. In addition, considerably large currents must be supplied to the magnet coils resulting in a relatively expensive design. A similar zero flux system in which the support rail mounted on the roadbed is not a conducting plate but is a multiplicity of conductor loops arranged one next to the other in the direction of travel has been described in an article by Powell et al, published in the Journal "Cyrogenics and Industrial Gases" vol. 4, pp 19–24, [1969]. In addition, to requiring relatively large size superconducting magnet coils the zero flux system also makes switch design difficult. Further because of the relatively heavy damping of excursion from the equilibrium position, overdamping can occur in the vertical direction resulting in slow return to the initial position.

Thus it can be seen that there is a need for a simplified system which provides the various advantages of the above described systems while avoiding their disadvantages.

SUMMARY OF THE INVENTION

The present invention provides such an improved system that combines the normal flux system and zero flux system to provide a system which is inexpensive, provides excellent support and guidance and which eases the design of switching. The system of the present invention has lower losses than the conventional system using U shaped guidance channels while maintaining good height and lateral stability and at the same time requires smaller coil current. Thus, for any given weight of vehicle, magnet coils of a smaller size than are required for a zero flux system result.

In general terms, the system comprises two U shaped guidance channels of non-magnetic electrically conducting material which are attached to and run along the roadbed each comprising an upper and lower part disposed in planes essentially parallel to the roadbed, i.e., horizontal and a lateral part disposed approximately perpendicular thereto. Pairs of superconducting magnets are mounted on the vehicle, with at least two pairs on each side thereof, and are arranged so that one magnet of each pair is situated between the upper and lower parts of the U shaped channels and that the second of the pair is vertically above the upper part of the channel. Thus the lower coil in conjunction with the lower part forms a normal flux system whereas the two magnet coils together with the upper part forms a zero flux system. This results in the lifting forces being distributed between the zero flux system and the normal flux system. As a result of this arrangement the current required per magnet coil in order to support a vehicle is not only smaller than that required in the zero flux system but is also smaller than that required in the previously described system wherein U shaped channels were used. As noted above this results in magnets of smaller size resulting in a less expensive system designed. The forces which occur within the magnetic coils due to the flow of current and which act on the conductors of the coil, particularly in the radial direction, can be more easily controlled. Furthermore the two magnet coils which are arranged vertically can be electrically connected in series and have power supplies of comparatively smaller design. As a result of the smaller coil currents, the losses in the U shaped guidance channel are also reduced as compared to previous systems.

The arrangement of the present invention also makes switch design simpler. Further, it permits fitting the characteristics of the suspension system to that of the propulsion devices used in the vehicle in order to maintain quite and steady travel. The losses in the zero flux system and thus the braking forces generated are maintained as low as possible by keeping the thickness of the upper parts of the U shaped guidance channels equal to or less than the depth of penetration of the magnet fields generated at the magnet coils at the highest travel velocity occurring in the operation of the vehicle. The depth of penetration, as is well known, depends, in each case, on the configuration of the magnetic field and thus on the geometric properties of the magnetic coils, particularly its length. Further it depends on the conductor material of the channels, particularly its electrical conductivity. Depth of penetration decreases, all other conditions being equal, as the travel velocity of the vehicle increases. In a preferred embodiment the upper and lower and lateral parts of the U shaped guidance channels can comprise electrically conducting plates arranged along the roadbed. Aluminum is the preferred plate material; however, copper and other electrically conductive materials may also be used. When using aluminum the condition that the thickness of the upper part be equal to or less than the depth of penetration will be met generally if the upper part is not thicker than approximately 1 cm. Plates may be of solid or laminated design. In addition, the upper, lower and lateral parts of the channel can be electrically connected with each other or if desired made from one piece, or welded from plates to form an integral piece. Rather than using conducting U shaped channels, short circuited conductor loops may be used instead with the loops contained in a suitable channel formed of an insulating material. In such a case the thickness of the conductors as measured perpendicular to the roadbed should be equal to or smaller than the depth of pentration of the magnetic field.

Preferably the ratio of the distance between each of the two magnet coil pairs of magnet coils to the distance between the upper and lower parts of the U shaped guidance channel will be between 0.7 and 1.3. By having distances which are close to each other, the result during operation is such that the lower magnet will be close to the plane bisecting the area between the upper and lower parts of the guidance channel and the upper part of the guidance channel will be close to the plane bisecting the space between the two coils in the pair. With such centering the ratio of braking force to lifting force is a minimum. Thus the overall system will have an excellent braking to lifting force ratio. With such an arrangement deviations from the prescribed position will result in restoring forces appearing which lead to high stability in the vertical direction and therefore a stiff motion having no oscillations of extended duration about the equilibrium position will result. The ideal ratio is 1. However, changing the ratio within the above defined limits permits matching the properties of the magnetic suspension system to a propulsion system.

Various arrangements of the U shaped guidance channels are disclosed. In one embodiment the channels open toward the center of the roadbed and in another open toward the edge of the roadbed. In a second embodiment in which the channels open toward the edge of the roadbed, the lateral parts of the two U shaped guidance channels are formed of a single part perpendicular to the roadbed thereby providing a unified structure which is preferably arranged in the center of the roadbed and requires less conducting material than is required for two separate U shaped guidance channels.

The best suited type of propulsion systems for a vehicle suspended in this manner is a linear motor. Typically the winding of the linear motor will be installed within the vehicle and a rotor of the linear motor will be a rail of electrically conductive material running along the roadbed and connected thereto. In the embodiment where the U shaped guidance channels are separate and arranged near the edge of the roadbed, the reaction rail or rotor can be mounted on the roadbed between the guidance channels. In the embodiment wherein the lateral parts of the two U shaped guidance channels are formed of a single part perpendicular to the roadbed, the single perpendicular part can be extended beyond the upper parts of the guidance channels to protrude into the air gap of the linear motor windings in the vehicle. It should be noted however, that the active winding of the linear motor can also be arranged and excited by a magnetic field traveling along side the roadbed with the rate of travel being the desired vehicle velocity. In such an arrangement one or several coils excited by a DC magnet field are placed in the vehicle and will thereby follow the traveling magnetic field running along side the roadbed in the manner of a synchronous motor. In such a case the superconducting support and guidance magnets can also be used as the vehicle coils. Then the active windings can be vertically arranged alongside the roadbed between the two pairs of magnet coils placed on the two sides of the vehicle.

Also described is the manner in which the characteristics of the guidance system of the present invention may be matched to the characteristics of the propulsion system. The characteristic of the propulsion system is the relation between the driving force and the velocity. The braking forces which are developed between the superconducting magnet coils and U shaped guidance channels can be matched to the propulsion forces of the linear motor in such a manner so that if the vehicle is operated at uniform speed and one of the forces changes, the other force is changed with the same direction so that steady movement free of jerks is obtained.

Difficulties which usually arise in switches associated with magnetic suspension railroads are not present in the present arrangement. In the area of the switch only the lower part of the guidance channel is provided along with a movable lateral part. Thus in the area of the switch only a normal flux system is provided to supply the necessary lateral forces. The displacable lateral parts provide good horizontal guidance through the region of the switch.

DETAILED DESCRIPTION OF THE PREFERRED EMBODIMENT

Figure 1:
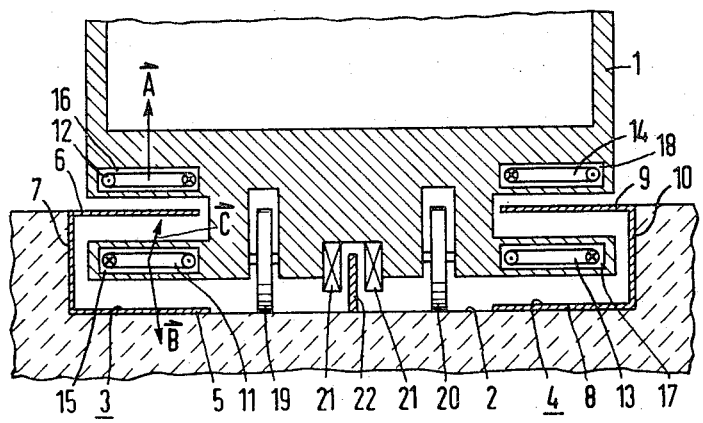
FIG. 1 is a cross-sectional schematic view illustrating a first embodiment of the present invention.

FIG. 1 illustrates a first embodiment of a magnet system according to the present invention. In the system shown thereon a vehicle 1 is suspended above a roadbed 2. On each side of the roadbed there is provided a U shaped channel with the right hand channel designated 4 and the left hand channel as 3. Each of the channels is comprised of a lower part designated 5 for the left hand channel and 8 for the right hand channel, an upper horizontal part designated 6 for the left hand channel and 9 for the right hand channel and a vertical part designated 7 for the left hand channel and 10 for the right hand channel. The individual plates making up the U shaped channels will preferably be of aluminum although other conductive non-magnetic materials may be used. The joints between the vertical and horizontal plates will be made of a single piece of sheet metal which is bent to provide the desired shape. A plurality of sections of such channels will be arranged along the length of the roadbed one behind the other in the direction of travel.

Mounted within the vehicle are pairs of superconducting magnet coils of which two pairs 11 and 12 and 13 and 14 are shown. A plurality of such pairs will be disposed on each side of the vehicle with one above the other as illustrated. For vehicles which are not too long, pairs at each end of the vehicle will be sufficient. The lower coils 11 and 13 move in the respective guidance channels 3 and 4 when the vehicle is in motion. The upper coils 12 and 14 ride above the respective upper parts 6 and 9 preferably with the upper parts 6 and 9 centered between the two coils as will be discussed in more detail below. As illustrated by the crosses and dots the respective pairs of coils are excited in opposite directions. This results in each pair of coils along with its associated upper part of the U shaped guidance channel forming a zero flux system while the lower coil with the lower part of the guidance channel forms a normal flux system. Each of the magnet coils is located with a cyrostat designated by the reference numbers 15 through 18 which is filled with a cooling medium such as liquid helium to keep the coils at a low temperature, i.e., a few degrees K in order to bring about and maintain a superconducting state. In addition to the magnetic suspension system the vehicle 1 is provided with wheels 19 and 20 which can roll on the roadbed 2 and are used for acceleration and deceleration when stopping and starting at which times the vehicle velocity is not sufficient for operation of the magnetic suspension system. In this embodiment the wheels ride directly on the roadbed. However, as will be seen below, tracks may be provided as in conventional railroads. Also shown attached to the vehicle are the stator parts 21 of a linear motor which reacts with a reaction rail or rotor part 22 mounted to the roadbed.

The forces which occur in the magnetic suspension system are illustrated on FIG. 1 for the coil pair 11 and 12. The forces resulting from the zero flux system comprising the coil pair 11 and 12 and the upper channel part 6 in the case of a deriation from the medium position are designated by the letters A and B. The force B is directed toward the roadbed, the force A away from the roadbed against the gravity force of the vehicle. From the normal flux system comprising the lower coil 11 and the lower channel part 5, the force C is developed. The force C is also in an upward direction. As can be seen from the Figure the forces B and C each have a component which is directed horizontally to the roadbed, and perpendicular to the direction of travel. This component of the force is produced by the current induced in the lateral part 7 of the guidance channel and results in proper horizontal guidance of the vehicle. In addition, each of the forces A B and C will have components which are in the horizontal direction and opposite to the direction of travel, i.e., out of the plane of the paper. These are not shown on FIG. 1 and are the braking forces referred to above. If the direction of travel is designated as the X direction and the direction perpendicular to the roadbed as the Z direction, the following equations express the overall lifting forces and braking forces:

$$K_H = [A_z - B_z] + C_z$$
$$K_B = [A_x - B_x] + C_x$$

Where $K_H$ is the lifting force and $K_B$ the braking force. It should be noted, as illustrated in FIG. 1, that the lower parts 5 and 8 of the guidance channels which take up a considerable part of the lifting forces rests directly on the roadbed and are thus on a firm foundation.

Figure 2:
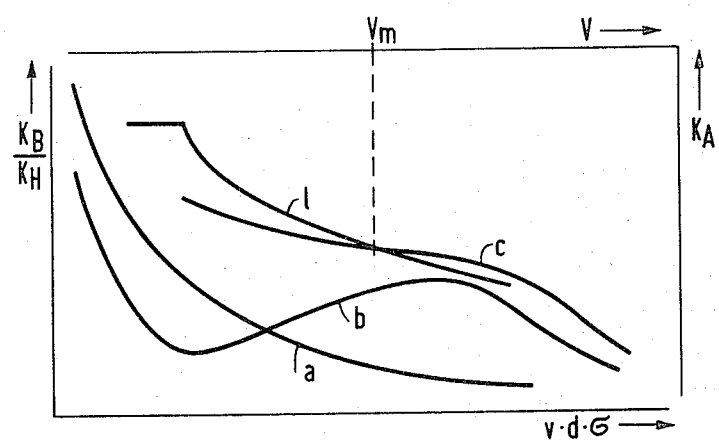
FIG. 2 is a diagram illustrating the relationship between lifting forces and braking forces along with illustrating the linear motor characteristics.

FIG. 2 is a curve illustrating the relationship between the product $v.d.\sigma$ and the ratio of braking to lifting force, $K_B/K_H$. The ratio of the braking force to the lifting force $K_B/K_H$ is plotted on the left hand ordinate and the product $v.d.\sigma$ on the lower abscissa. V is the velocity of the vehicle relative to the roadbed, $\sigma$ the electrical conductivity of the material in the guidance channel and $d$ the thickness of the guidance channel. Curve a illustrates the ratio of the braking to lifting force for the normal flux system comprising the lower guidance channel part and the respective lower coil of the coil pair. Curve b illustrates the ratio of braking to lifting force for the zero flux system comprising the upper guidance channel part and a respective coil pair. Curve c shows the ratio of braking to lifting force for the overall system. For d and $\sigma$ fixed, the dependence of the ratio of the braking to lifting force upon the velocity of the vehicle can be seen from examining the curves a to c. It can also be seen from the curves a and b that by increasing the thickness of the plates or by increasing electrical conductivity of the plate material, in the normal flux system the ratio of braking to lifting force can be decreased and that in the zero flux system, illustrated by curve b the ratio may be decreased by changing the conductivity of the upper parts of the channel. In the case of zero flux system the plate thickness is generally smaller than the depth of penetration of the magnetic field and therefore plays a lesser role. It should be noted that the ratios of the braking to lifting forces generated by the two systems can be changed independently of each other, for example, by choosing materials of different conductivity for the upper and lower parts of the guidance channel. This permits the ratio of braking to lifting force shown by the curve c for the overall system to be matched to different operating conditions by designing individual systems accordingly. Finally, the ratio of braking to lifting forces can be changed by changing the ratio of distance between the two respective magnet coils to the distance between the upper and lower parts of the U shaped guidance channel. As noted above, this ratio should be maintained in the range of 0.7 to 1.3. As higher velocities are approached the ratio of the braking to the lifting force is proportional to the braking force developed in the magnet system of the present invention since the lifting force rapidly approaches a limit and no longer increases with increasing velocity.

An additional curve labeled 1 is shown on FIG. 2 and illustrates the characteristics of a linear motor, i.e., the propulsion force of the linear motor as a function of vehicle velocity. The velocity V is plotted on the upper abscissa and the propulsion force $K_A$ on the right hand ordinate. For the example shown, the braking force of the overall system as illustrated by curve c and d and $\sigma$ fixed and thus a function of velocity V is matched for a mean velocity $V_m$ to the propulsion force of the linear motor in such a manner that if one force is changed the other force also changes in the same sense. Thus if, for example, the braking force becomes larger, which would result in a decrease in travel velocity, the propulsion force of the linear motor increases at the same time to make up the reduction in velocity which would otherwise result. The result is steady motion without jerks. In addition to the braking forces described above, braking forces generated by the air resistance of the vehicle will also have to be taken into consideration when matching. When the forces are matched as described above additional steps must be taken for braking the vehicle. This can be done for example by reversing the direction of current of one coil of each coil pair or in some of the coil pairs to obtain braking forces. In that case the coil pair in question will no longer form a zero flux system and the losses in the upper parts of the guidance channels and thus the braking forces will increase.

Figure 3:
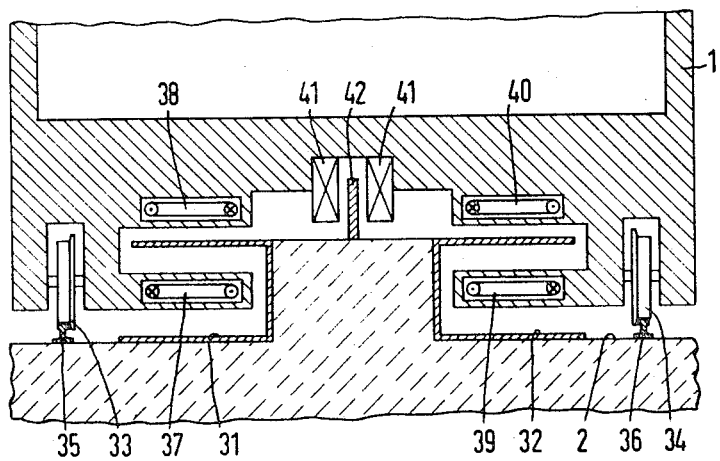
FIG. 3 is a cross-sectional view of a second embodiment of the present invention.

A system in which the guidance channels open outwardly rather than inwardly as shown on FIG. 1 is illustrated by FIG. 3. In this embodiment the two guidance channels 31 and 32 are arranged along the center of the roadbed 2. The wheels 33 and 34 on the vehicle are guided by tracks 35 and 36 and are only used as noted above, during acceleration and deceleration. In this embodiment the wheels are on the outside of the guidance channels. The pairs of magnet coils 37 and 38 and 39 and 40 are mounted in a manner similar to those described above in connection with FIG. 1. A rotor rail 42 is provided which reacts with the stator parts 41 of the linear motor in the manner described above.

Figure 4:
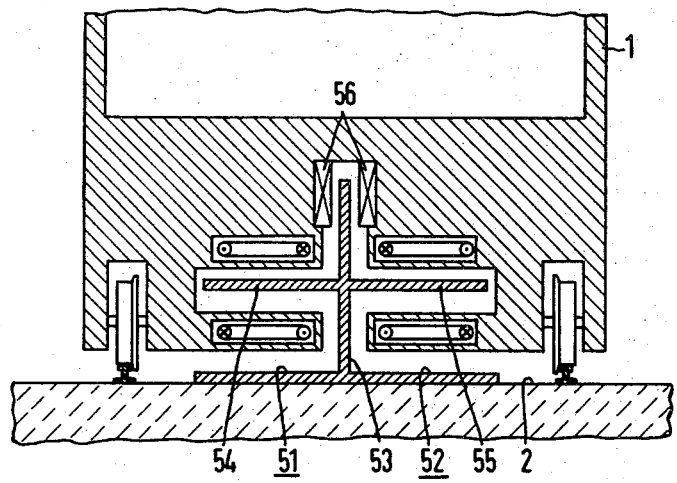
FIG. 4 is a cross-sectional view of a third embodiment of the present invention wherein the U shaped channels have a common vertical member which is extended to act as the linear motor rotor.

A further embodiment similar to that of FIG. 3 but which provides additional advantages is illustrated by FIG. 4. In this embodiment the lateral parts of the two guidance channels 51 and 52 is formed of a single member 53 which is also extended above the upper parts of the two guidance channels to form the reaction rail or rotor rail which reacts with the linear motor stators 56. In all other respects this embodiment is the same as that described in connection with FIG. 3. Thus the portions of the guidance and propulsion system which must be mounted in the roadbed can be made in a single structural piece resulting in simplified design and construction and lower cost of materials. Naturally the thickness, conductivity and other characteristics of the materials used can be varied as described above to meet the requirements for horizontal guidance and braking.

In all the above described embodiments the rotor rail for the linear motor can be made relatively low resulting in a savings of material. This is because of the stiff motion which is insured by the present system allowing only slight vertical deviations. Thus even a relatively low rotor rail cannot get out of the air gap of the linear motor winding due to vertical oscillations.

Figure 5:
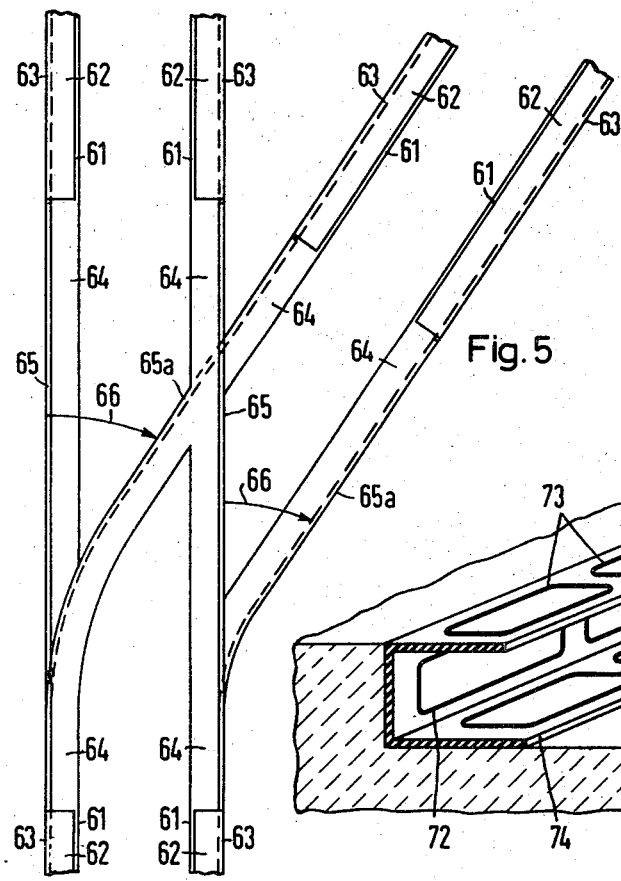
FIG. 5 is a plan view of a switch area according to the present invention.

FIG. 5 illustrates a switch arrangement for the embodiment of FIG. 1. On the areas outside of the switch, the guidance channels of the system each comprise a lower part 61, an upper part 62 and a vertical part 63, and are of U shaped design as described in connection with FIG. 1. However within the switch area, the upper parts 62 are eliminated and the guidance channels comprise only a horizontal lower part 64 and a vertical part 65. As illustrated on FIG. 5, the vertical parts 65 are shown in solid lines for straight ahead travel and in dotted lines for curved travel onto the switch track. Switching may be accomplished by shifting the lateral parts 65 horizontally with respect to the lower parts 64 in the direction of the arrows 66. Until they reach the position 65a illustrated by the dotted line. The lower parts 64 of the guidance channel are made wider at the important portions of the switch as illustrated by FIG. 5. The reduction of lifting force caused by the absence of the upper part 62 of the guidance channels within the area of the switch can be taken into account by increasing the lifting force generated by the normal flux system by changing either the thickness or conductivity of the lower part 64 of the guidance channels within the area of the switch. If the vehicle is propelled by a linear motor, the rotor rail of the linear motor installed on the roadbed can for example also be shifted horizontally along with the vertical part 65 or, alternatively, propulsion can be dispensed within the switch area with the vehicle permited to transverse the switch by momentum. The lateral part 65 need not be comprised of a single piece but may be comprised of sections which are shifted laterally different distances in order to set the switch. A further embodiment comprises mounting the lateral parts 65 and 65a for up and down motion. Thus either the lateral parts 65 or the lateral parts 65a may be extended with the other retracted in order to select the direction of travel through the switch.

Switches for the embodiments shown in FIGS. 3 and 4 can be constructed in a similar manner by making the lateral parts of the guidance channels movable in the area of the switch and omitting the upper parts of the channel. A switch for the embodiment shown in FIG. 4 in paticular can be designed so that the entire raillike part comprising the two U shaped guidance channels 51 and 52 is movable with respect to the roadbed in the area of the switch. The raising and lowering described above may be used to advantage in this arrangement. When constructing a switch in this manner, both the zero and normal flux systems are preserved in the area of the switch along with the propulsion system.

Figure 6:
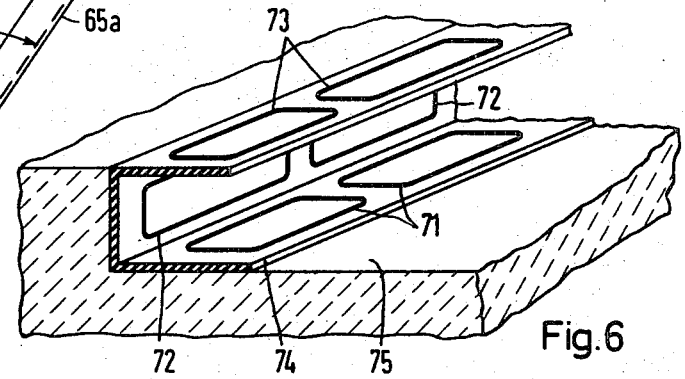
FIG. 6 is a perspective view illustrating the use of short circuited conductor loops in guidance channels according to the present invention.

In all of the embodiments descrribed above, the U shaped channels were described as being conducting plates. However, as illustrated by FIG. 6 such plates may be replaced by short circuit conductor loops arranged in U shaped insulating channels along the roadbed. Thus there are illustrated short circuit conducting loops 71 installed on the lower part of the channel, short circuit loops 72 in the vertical part of the channel and short circuit loops 73 in the upper part of the channel. These may for example be of aluminum and be embedded in a U shaped channel 74 made of electrically insulating material. As in the previous embodiments the U shaped channel or carrier for the loops is secured to the roadbed 75. Similarly, in the embodiment illustrated on FIG. 4 the rotor portion projecting into the air gap of the linear motor may also comprise short circuit conductor loops. Furthermore, when designing the system, both as to the guidance channels and the rotor rail combinations of short circuit loops and plates may be used. With the system of the present invention velocities of about 500km/hr can be obtained. An average velocity $V_m$ of about 300 Km/hr may be established. In the embodiment of FIG. 1 a small vehicle will have a weight of approximately 12 tons. Guided suspension of such a vehicle can be accomplished using four pairs of coils with two pairs at each end of the vehicle on opposite sides thereof. Such coils may comprise for example well known types of multiple core conductors in which a plurality of very thin wires of high field superconductor, preferably of a niobium tatanium alloy are embedded in a matrix of normally conductive material such as copper or copper-nickle alloy. The individual wires advantageously will be twisted about the axis of the multiple core conductor. Each coil can be designed for between $10^5$ and $10^6$ ampereturns. Typical coils will be about 1 meter long in the direction of travel and about 50 cm wide. The distance between the two coils of a pair will be approximately 50 cm. The U shaped guidance channels may comprise aluminum plates. The plates of the lower and lateral parts of the channels may in that case be approximately 2 cm thick and those in the upper parts of the channel about one cm thick. The depth of penetration of the magnet field will be about 10 cm at the average velocity indicated. The distance of the lower channel parts from the upper channel parts, each of which will be about 70 cm wide, should be about 60 cm. The braking force acting on the vehicle at a speed at about 300 Km/hr and therefore the propulsion force required to overcome this braking force is approximately $2 \times 10^3$ newtons. Depending on the ampere turns of the magnet coils the lifting force is of the order of ten to one-hundred times the braking force.

Thus an improved magnet system for the suspension of a vehicle has been shown. Although specific embodiments have been illustrated and described it will be obvious to those skilled in the art that various modifications may be made without departing from the spirit of the invention which is intended to be limited by the appended claims.

What is claimed is:

1. A magnet system for the guidance and suspension of a vehicle moving along a roadbed comprising:
    a. two U-shaped guidance channels arranged in the direction of the roadbed and attached thereto, each comprising upper and lower parts lying in planes substantially horizontal and a lateral part substantially vertical, said guidance channels being constructed so as to provide eddy current paths in each of said upper, lower and lateral parts;
    b. a first plurality of magnet coils mounted in the vehicle and lying in a horizontal plane which falls between the upper and lower parts of the guidance channel; and
    c. a second plurality of magnet coils arranged in a horizontal plane above the horizontal plane containing said first plurality of magnet coils, said plane being vertically above the upper part of said guidance channels, whereby said first plurality of coils will react with their respective lower parts of said guidance channels to provide a normal flux system for vertical suspension and said first and second plurality of magnet coils will act in pairs with their respective upper parts of said guidance channels to form a zero flux suspension system.

2. The invention according to claim 1, wherein the thickness of the upper part of each U-shaped guidance channel is equal to or smaller than the depth of penetration of the magnetic field produced by said first and second plurality of magnet coils at the highest travel velocity occurring in vehicle operation.

3. The invention according to claim 1, wherein said U-shaped guidance channels comprise electrically conducting plates.

4. The invention according to claim 1, wherein said U-shaped guidance channels comprise short circuited conductor loops contained in a U-shaped supporting structure.

5. The invention according to claim 1, wherein the ratio of the distance between two respective magnet coils of a pair to the distance between the upper and lower part of said U-shaped guidance channels is in the range of 0.7 to 1.3.

6. The invention according to claim 1, wherein said U-shaped guidance channels open toward the center of the roadbed.

7. The invention according to claim 1, wherein said U-shaped guidance channels open toward the edge of the roadbed.

8. The invention according to claim 7, wherein the lateral parts of said U-shaped guidance channels are formed of a common member.

9. The invention according to claim 1 and further including a linear motor for driving said vehicle.

10. The invention according to claim 9, wherein the active winding of the linear motor is installed in the vehicle and the linear motor rotor comprises an electrically conductive rail running along the roadbed.

11. The invention according to claim 10, wherein said rail is attached to the roadbed between said two U-shaped guidance channels.

12. The invention according to claim 11, wherein said two U-shaped guidance channels are opened toward the edge of the roadbed with a single vertical part forming the vertical parts of both U-shaped guidance channels and wherein said single vertical part is extended above the upper parts of the guidance channels to proturde into the air gap of the linear motor winding to form the rotor part of the linear motor.

13. The invention according to claim 9, wherein the braking forces between said magnet coils and said U-shaped guidance channels are matched to the propulsion force of the linear motor so that if the vehicle is operated at uniform speed and one of the braking force and propulsion force changes, the other force changes in the same direction.

14. The invention according to claim 1, wherein in switch areas the guidance channels comprise only a lower and lateral part, with said lateral parts made movable with respect to said lower parts.

15. The invention according to claim 8, wherein in the area of a switch said two U-shaped guidance channels formed in a single part are made movable with respect to the roadbed.

* * * * *

UNITED STATES PATENT OFFICE
CERTIFICATE OF CORRECTION

Patent No. 3,841,227  Dated October 15, 1974

Inventor(s) Hermann Fink

It is certified that error appears in the above-identified patent and that said Letters Patent are hereby corrected as shown below:

In column 6, line 45, change "deriation" to --deviation--

In column 7, line 2, change "$K_B = [A_x - B_x] + C_x$" to $$--K_B = [A_x + B_x] + C_x--$$

Signed and sealed this 21st day of January 1975.

(SEAL)
Attest:

McCOY M. GIBSON JR.
Attesting Officer

C. MARSHALL DANN
Commissioner of Patents